United States Patent
Kashima

(10) Patent No.: US 6,421,245 B1
(45) Date of Patent: Jul. 16, 2002

(54) IC CARD READ/WRITE APPARATUS

(75) Inventor: Masanori Kashima, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/366,195

(22) Filed: Aug. 4, 1999

(30) Foreign Application Priority Data

Aug. 5, 1998 (JP) .......................................... 10-221369
Aug. 7, 1998 (JP) .......................................... 10-223938

(51) Int. Cl.[7] .......................... H05K 7/14; H01R 13/62
(52) U.S. Cl. ........................ 361/737; 361/741; 361/756; 361/801; 361/809; 439/260; 439/326
(58) Field of Search .................................. 361/728, 737, 361/740, 756, 759, 801, 802, 809, 741; 439/260, 326, 377; 235/482, 484

(56) References Cited

U.S. PATENT DOCUMENTS

| 4,976,630 A | | 12/1990 | Schuder et al. | |
|---|---|---|---|---|
| 5,613,866 A | * | 3/1997 | Niimura | 439/260 |
| 5,718,609 A | * | 2/1998 | Braun et al. | 439/630 |
| 5,904,589 A | * | 5/1999 | Asakawa | 439/495 |

FOREIGN PATENT DOCUMENTS

| JP | 4-184694 | 7/1992 |
|---|---|---|
| JP | 5-120498 | 5/1993 |

* cited by examiner

Primary Examiner—Jayprakash N. Gandhi
(74) Attorney, Agent, or Firm—Wenderoth, Lind & Ponack, L.L.P.

(57) ABSTRACT

An IC card read/write apparatus of the present invention includes a frame having first and second parallel guides spaced apart from each other. The first and second guides define an extended and thinned card chamber for receiving an IC card, a card inlet connected at one end of the card chamber through which an IC card is inserted in the card chamber, and an end path connected to the opposite end of the card chamber and angled to the card chamber so that an insert end of the inserted IC card is forced in the path and then held in the end path.

20 Claims, 26 Drawing Sheets

IC CARD READ/WRITE APPARATUS

FIELD OF THE INVENTION

The present invention relates to an IC card read/write apparatus for an IC card equipped with an integrated circuit. In particular, the present invention relates to an IC card read/write apparatus for reading information from the integrated circuit of the IC card and writing information into same.

BACKGROUND OF THE INVENTION

FIGS. 1 to 6 illustrates a conventional IC card read/write device. The read/write device generally indicated by reference numeral 1 includes a rectangular peripheral frame portion 3. The frame portion 3 includes a pair of spaced apart top and bottom plates, 7 and 9, which define a thinned card chamber 11 between them for receiving an IC card 13. The peripheral frame portion 3 is formed in its forward wall 15 with a card inlet 17 which is connected with the card chamber 11 so that the IC card 13 can be inserted through the card inlet 17 into the card chamber 11 in a direction indicated at 19.

A slider 21, which is supported by the top plate 7 to move back and forth in the direction 19, is connected with a spring 23 mounted on the top plate 7 and thereby biased toward the card inlet 17. Also, the slider 21 is formed at one end thereof away from the card inlet 17 with a portion 25 projected into the card chamber 11 so that, when a leading edge of the card 13 has reached in the vicinity of a rearward end of the card chamber 11, it makes an engagement with the projected portion 25. Further, as best shown in FIGS. 1, 5, and 6, the slider 21 has a cutout 27.

The top plate 7 carries a holder 29 which supports electric cables 31 on its upper surface and electric contacts 33 on its lower surface, each of the electric contacts 33 being connected with the associated cable 31. The holder 29, which is rotatably supported by a shaft 35 extending in a direction perpendicular to the insert direction 19, has an actuator 37 projected in the cutout 27 of the slider 21. The actuator 37 is formed in its edge facing to the inlet 17 with a ramp 39 which extends upward toward the rearward end of the device 1 and opposes an edge 41 of the cutout 27 so that, when the slider 21 moves rearward by the engagement with the leading edge of the card 13, the edge 41 would engage with the ramp 39 to rotate the actuator 37 and the holder 29 toward the bottom plate 9 as shown in FIGS. 5 and 6.

In addition, as best shown in FIG. 6, in the vicinity of the rearward end of the card chamber 11, the top plate 7 is formed in its bottom surface with ramps 43 each protruded in the card chamber 11. To cooperate with the ramp 43 to nip the leading end of the card 13 which has been inserted up to the rearward end of the chamber 11 and thereby hold the inserted card 13 in position, leaf springs 45 are provided under the card chamber 11 with its rearward end positioned in the card chamber 11.

With the arrangement so constructed, as shown in FIG. 3, the card 13 is inserted through the card inlet 17 into the card chamber 11. When the card 13 is inserted to a predetermined position, its leading edge brings into contact with the projected portion 25 of the slider 21. From this state, the card 13 is further forced into the card chamber 11 against a resistance applied from the spring 23, which moves the slider 21 toward the rearward end of the chamber 11. As shown in FIGS. 5 and 6, this causes that the edge 41 of the cutout 27 makes a frictional contact with the ramp 39 to rotate the holder 29 toward the bottom plate 9 so that each of the electric contacts 33 makes an electric contact with an associated contact 47 provided in an upper surface of the card 13.

Finally, when the card 13 is inserted to its reading/writing position as shown in FIGS. 4 and 6, it is nipped at its leading end between the protrusion 43 of the top plate 7 and the leaf spring 45. This allows the card 13 to be retained in the card chamber 11 even after it is released from the insertion force. Also, the electric contacts 33 projected into the card chamber 11 make contacts with associated contacts 47 of the card 13. This allows the integrated circuit mounted in the card 13 to communicate through the cables 31 with a controller (not shown) for reading information from the card 13 and writing information into the card 13.

After the completion of the required communication, the card 13 is held at its forward end and then pulled out from the card chamber 11, causing the slider 21 to return to its original position by the spring 23. This also causes the actuator 37 to disengage with the edge 41 of the cutout 27 and then rotate the holder 29 upward, so that the electric contacts 33 moves away from the contacts 47 of the card 13.

The conventional card read/write device 1, however, has several drawbacks. For example, because the leaf spring 45 is typically made from a metal plate having a thickness of 0.2 to 0.3 mm and also bent as shown in FIG. 5 at its intermediate portion, the position of the rearward end varies in the card chamber 11, which in turn destabilizes the force for nipping and holding the card 13.

In addition, the International Organization for Standardization (ISO) 7815 allows a dimensional error of 0.76±0.08 mm in the thickness of the IC card, which accelerates the instability of the inserted card 13 to result in an undesired translation of the card even by small vibrations. This may result in a communication error between the contacts of IC card 13 and the device 1. Contrary to this, an excessive force applied from the leaf spring 45 may cause the card to be scratched and then damaged by the contact with the metal leaf spring 45.

Besides, an insertion of foreign members such as coin, rather than the regular IC card, will result in a malfunction of device.

FIGS. 7 to 9 illustrate a protection cover generally indicated by reference numeral 51, which is attached in front of the IC card read/write device 1 described above. The protection cover 51 includes a housing generally indicated by reference numeral 53. The housing 53 has a card slot 55 through which the IC card 13 is inserted in the device 1. When the IC card 13 is not inserted in the device, the slot 55 is covered at its outlet by a shutter 57 rotatably supported by shafts 59.

For the protection cover 51, the card 13 is inserted in the slot 55 from its leading edge by the user of the card 13. When the leading edge of the card 13 makes a contact with the shutter 57, the shutter 57 is forced to rotate about the shafts 59 away from an outlet of the slot 55, which allows the card 13 to advance into the card chamber.

The shutter 57, however, allows foreign members that does not meet the ISO 7815, such as thinned telephone card having a thickness of only 0.2 mm, other specialized small-sized card, rod having a diameter smaller than the slot, and other small pieces. An insertion of such foreign member will damage the device 1 and, if remained only in part, will prevent the regular card from being inserted or used.

SUMMARY OF THE INVENTION

Accordingly, an object of the present invention is to provide an IC card read/write device capable of positively holing an inserted card in position.

Another object of the present invention is to provide an IC card read/write device capable of preventing the IC card from being damaged.

Another object of the present invention is to provide an IC card read/write device capable of removing irregular members such as coin from a card chamber, which would otherwise result in a malfunction of the device.

Another object of the present invention is to provide a protection cover, which allows only the normal IC card that meets the ISO 7816 to be inserted in an IC card read/write device.

Another object of the present invention is to provide an IC card read/write device capable of preventing the foreign members rather than the normal IC card that meets the ISO 7816 from being inserted into the device.

Another object of the present invention is to provide an IC card read/write device capable of removing the foreign members inserted in the device.

Therefore, an IC card read/write apparatus of the present invention includes a frame having first and second parallel guides spaced apart from each other. The first and second guides define an extended and thinned card chamber for receiving an IC card, a card inlet connected at one end of the card chamber through which an IC card is inserted in the card chamber, and an end path connected to the opposite end of the card chamber and angled to the card chamber so that an insert end of the inserted IC card is forced in the path and then held in the end path.

In another aspect of the present invention, the end path is formed by a ramp extended from the opposite end of the first guide and projected toward the second guide and a recess extended from the opposite end of the second guide and recessed against the first guide.

In another aspect of the present invention, the ramp is angled at about 30 to 45 degrees to the first guide.

In another aspect of the present invention, the apparatus includes a plurality of the end paths.

Also, an IC card read/write apparatus includes a frame having upper and lower parallel plates spaced apart from each other to define an extended and thinned card chamber for receiving an IC card. The lower plate has an opening so that a foreign insert inserted in the card chamber will fall out of the card chamber through the opening.

In another aspect of the present invention, an edge defining the opening is slanted downward.

Further, a protection mechanism for use with an IC card read/write apparatus includes a housing which defines a slot having an inlet and an outlet through the inlet and outlet an IC card is inserted in the IC card read/write apparatus, a first arm which moves between a first position in which the first arm positions in the slot and a second position in which the first arm positions away from the slot, wherein the arm moves from the first position to the second position by the contact with the IC card inserted in the slot, a shutter which moves between a first position in which the shutter closes the outlet of the slot and a second position in which the shutter moves away from the outlet of the slot, and a second arm, connected with the first arm so that, when the first arm moves from its first to second position, the second arm moves the shutter from its first to second position to open the outlet of the slot and, when the first arm moves from its second to first position, the second arm moves the shutter from its second to first position to close the outlet of the slot.

In another aspect of the present invention, the apparatus includes a tongue bent or curved away from the outlet of the slot. The tongue is supported by the shutter so that, when the shutter takes the first position, the tongue positions adjacent to the outlet of the slot. On the other hand, when the shutter takes the second position, the tongue makes a frictional contact with one surface of the IC card to move away from the outlet.

DETAILED DESCRIPTION OF THE PREFERRED EMBODIMENTS

Figure 1:
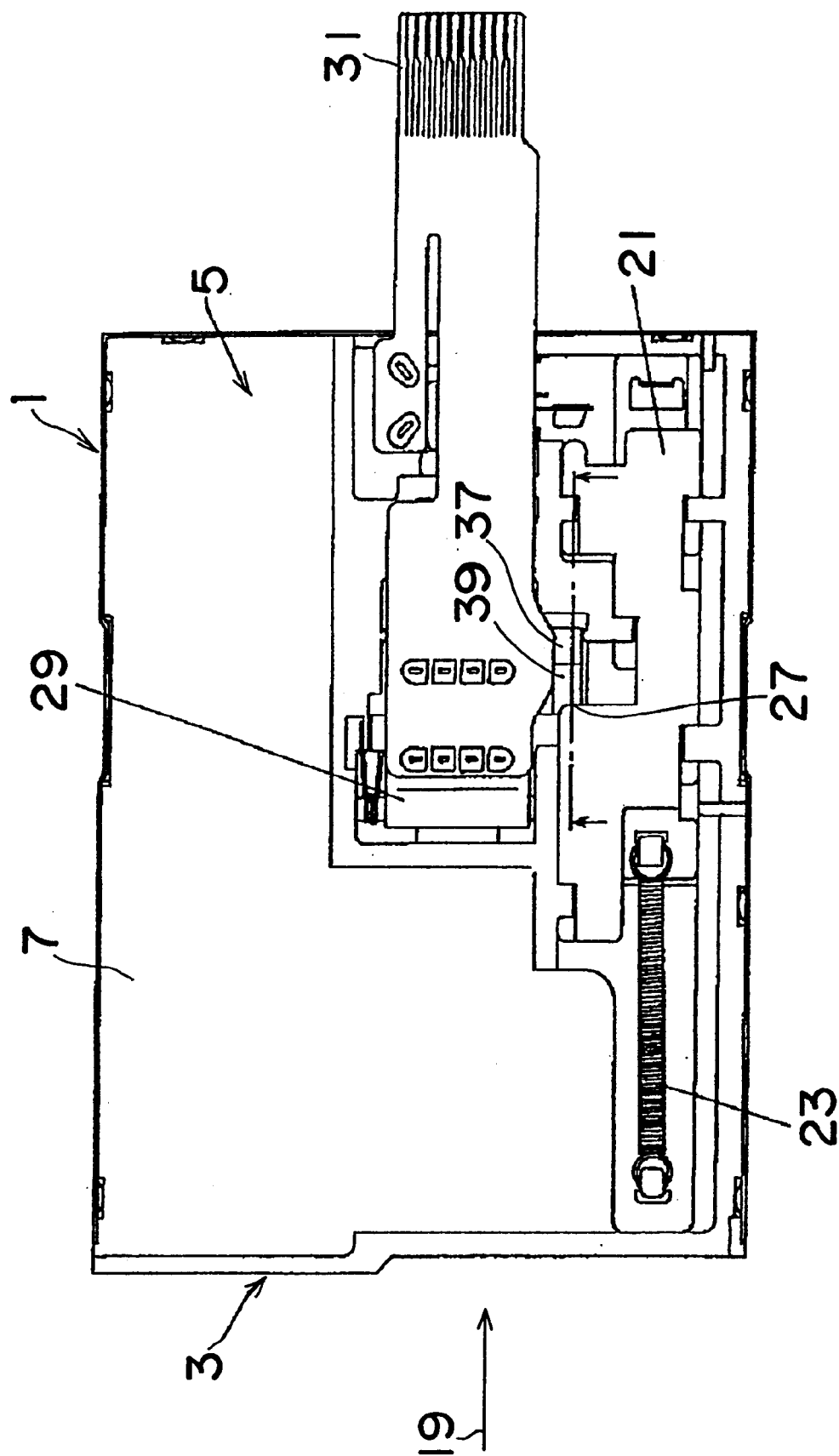
FIG. 1 is a plane view of a conventional IC card read/write device.
Figure 2:
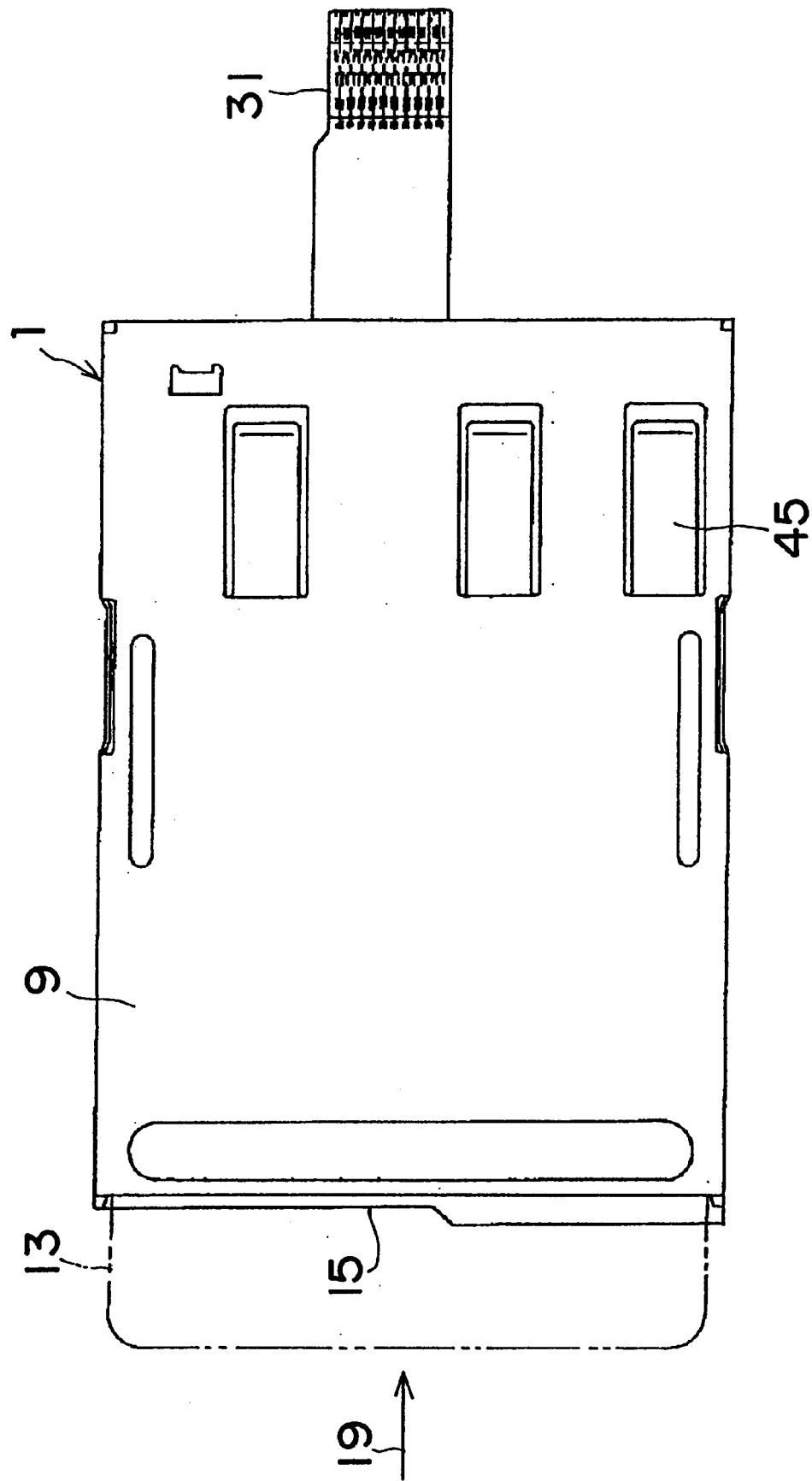
FIG. 2 is a bottom view of the conventional IC card read/write device shown in FIG. 1.
Figure 3:
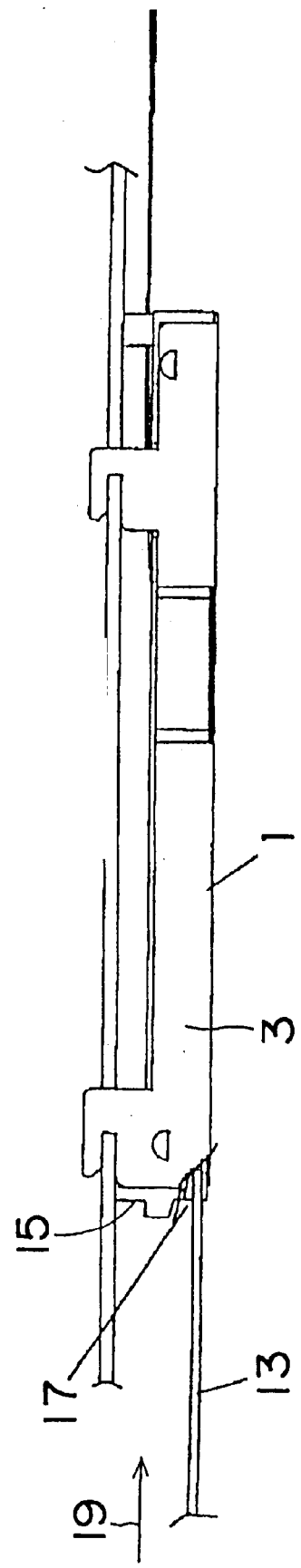
FIG. 3 is a side elevational view, partially in section, of the conventional IC card read/write device shown in FIG. 1.
Figure 4:
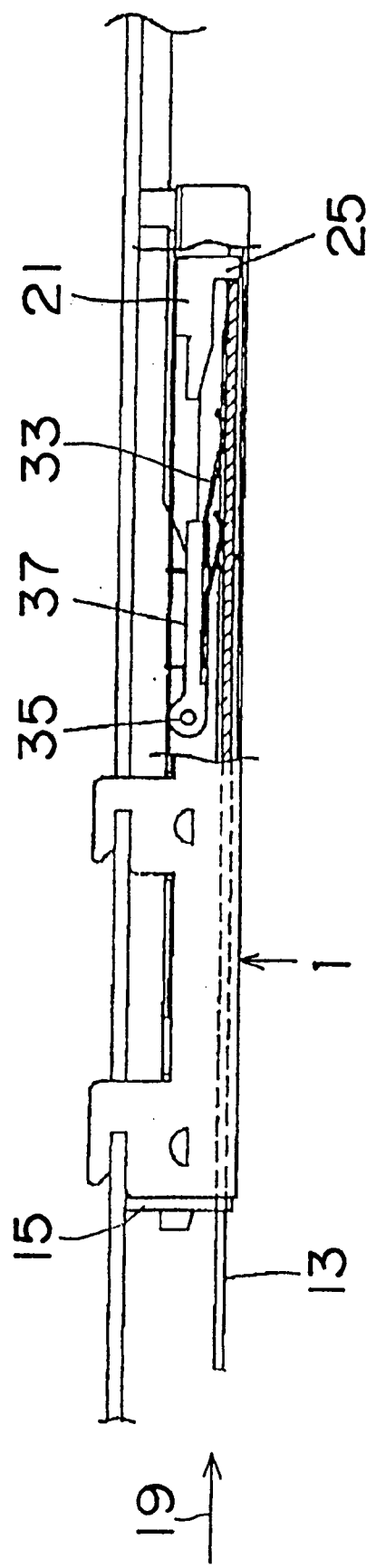
FIG. 4 is also a side elevational view, partially in section, of the conventional IC card read/write device shown in FIG. 1.
Figure 5:
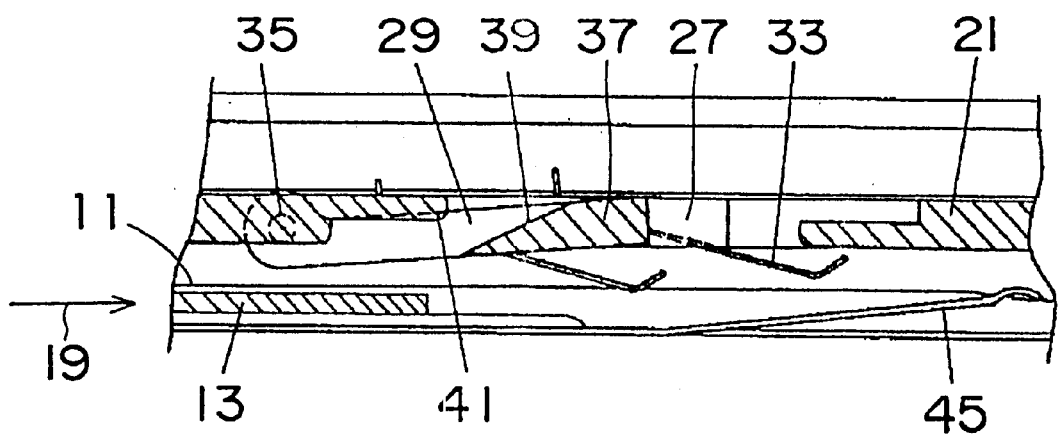
FIG. 5 is an enlarged cut-away side elevational view of the conventional IC card read/write device shown in FIG. 1.
Figure 6:
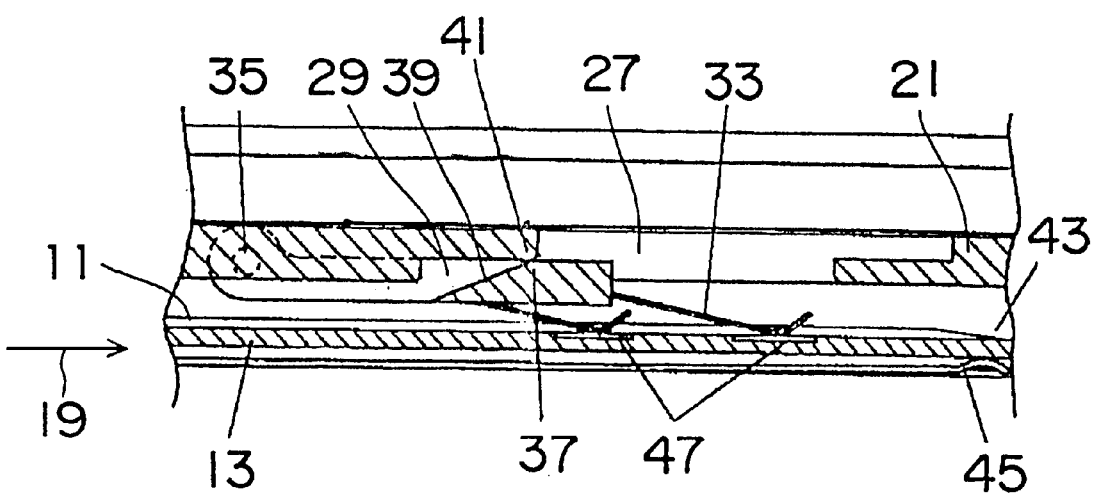
FIG. 6 is an enlarged cut-away side elevational view of the conventional IC card read/write device shown in FIG. 1.
Figure 7:
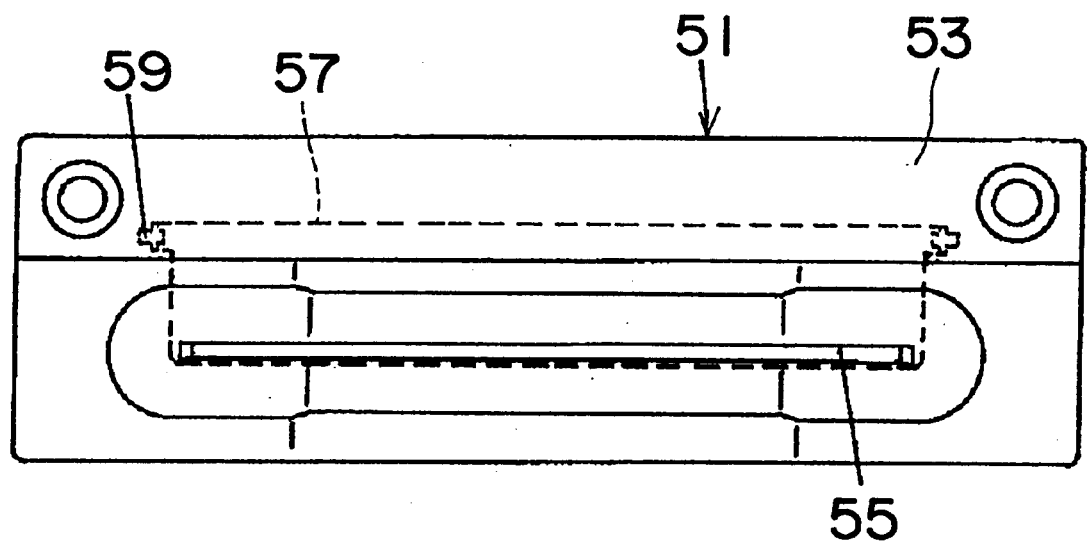
FIG. 7 is a front view of a conventional protection cover for use with the IC card read/write device shown in FIG. 1.
Figure 8:
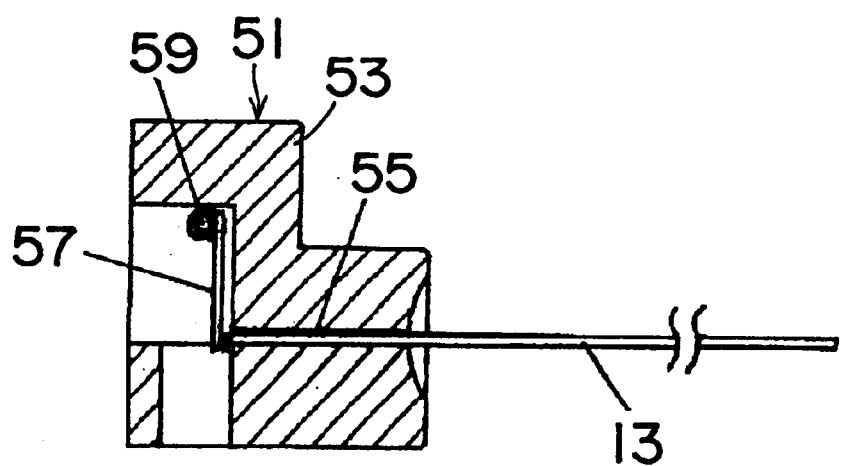
FIG. 8 is a cut-away side elevational view of the conventional protection cover shown in FIG. 7.
Figure 9:
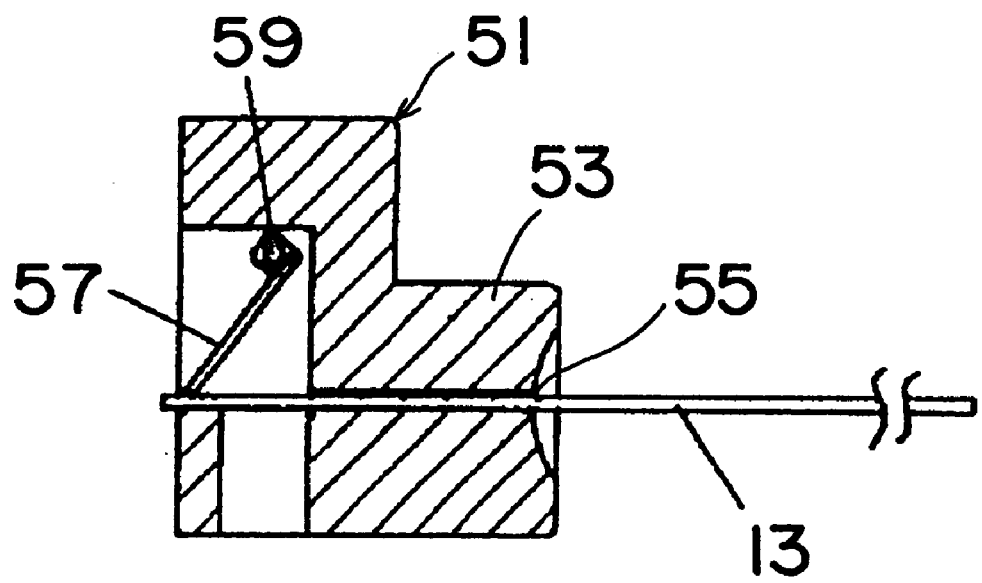
FIG. 9 is also a cut-away side elevational view of the conventional protection cover shown in FIG. 7.
Figure 10:
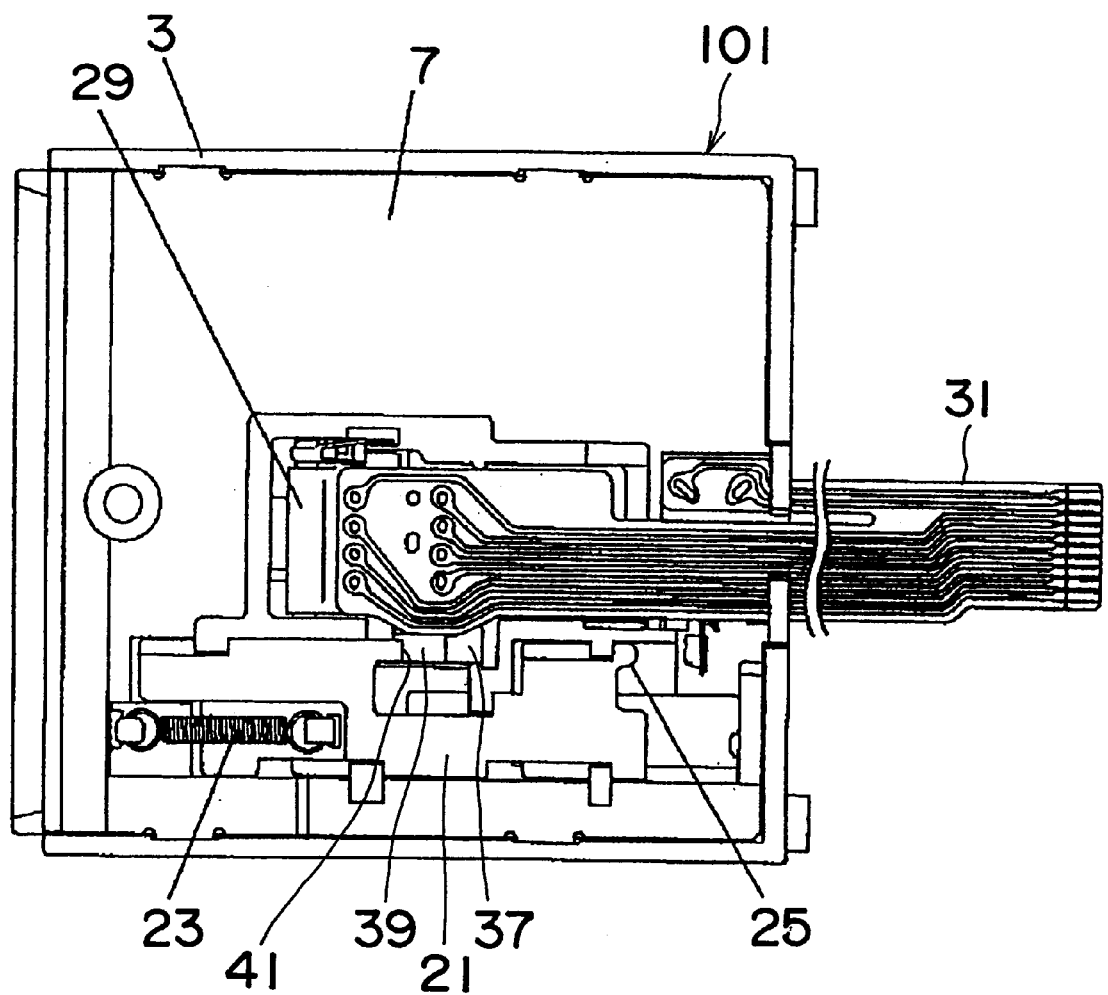
FIG. 10 is a plane view of an IC card read/write device according to the present invention.

With reference to the drawings, preferred embodiments of the present invention will be described below. Referring to FIG. 10, there is shown an IC card read/write device according to the present invention, generally indicated by reference numeral 101.

Basically, the read/write device 101 is similar to the conventional read/write device 1 described in connection with FIGS. 1 to 6 and therefore like reference numerals designate like parts throughout the drawings. Also, to clarify the description and to highlight the features of the present invention, only portions and parts different from those noted above will be described in detail below.

Figure 11:
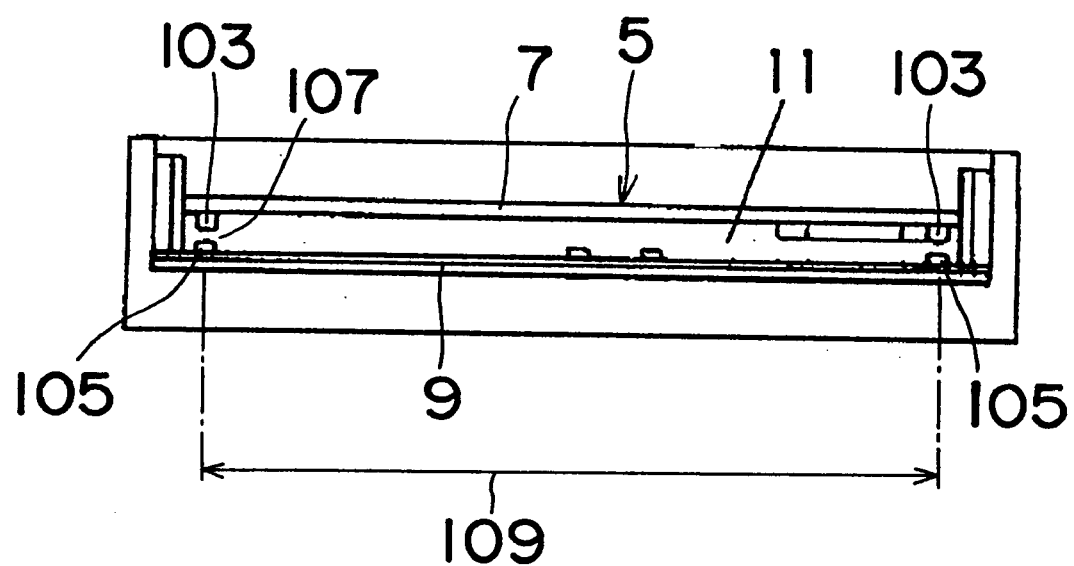
FIG. 11 is a front view of the IC card read/write device shown in FIG. 10.

Specifically, as best shown in FIG. 11, the top plate 7 is formed in its bottom surface with a pair of upper guide ribs 103 extending from the inlet 17 to the rearward end of the card chamber 11 on opposite sides, i.e., left and right sides, of the chamber 11. The bottom plate 9 is formed in its upper surface with a pair of lower guide ribs 105 extending from the inlet 17 to the rearward end of the card chamber 11 on opposite sides, i.e., left and right sides, of the chamber 11. The upper and lower ribs, 103 and 105, opposes to each other to define a gap 107 between them which is slightly greater than the thickness of the regular IC card 13 to be inserted.

Preferably, as shown in FIG. 11, a distance 109 between the left and right ribs, 103 and 105, is about 50 mm which is smaller than the regular card size (i.e., 53.92 to 54.03 mm) in its transverse direction regulated in the ISO 7815. Although the opposing upper and lower ribs, 103 and 105, are provided only on left and right sides of the chamber 11, they may be added at the center of the chamber 11.

Figure 15:
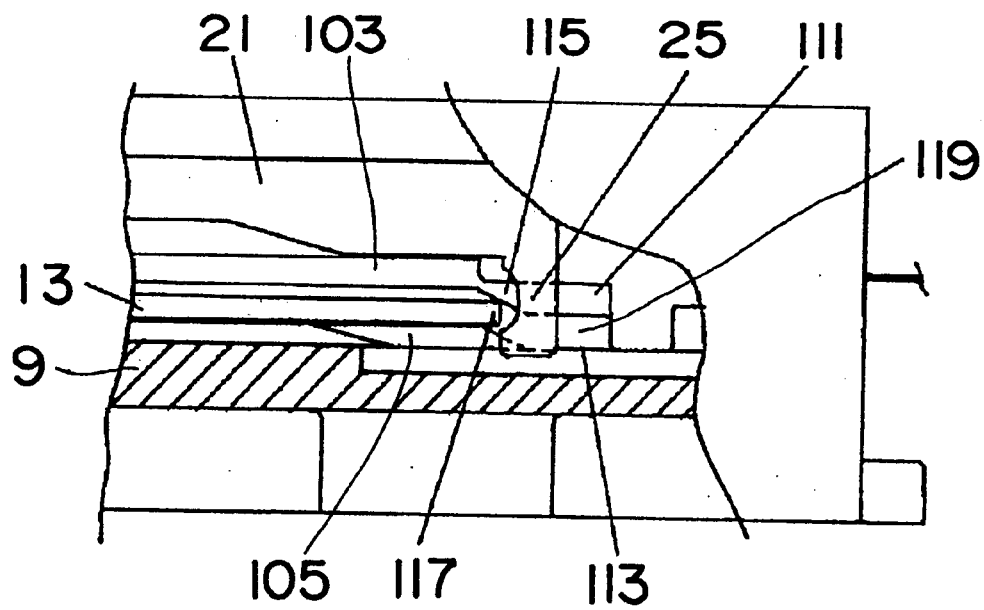
FIG. 15 is an enlarged cut-away side elevational view of the IC card read/write device shown in FIG. 10.
Figure 16:
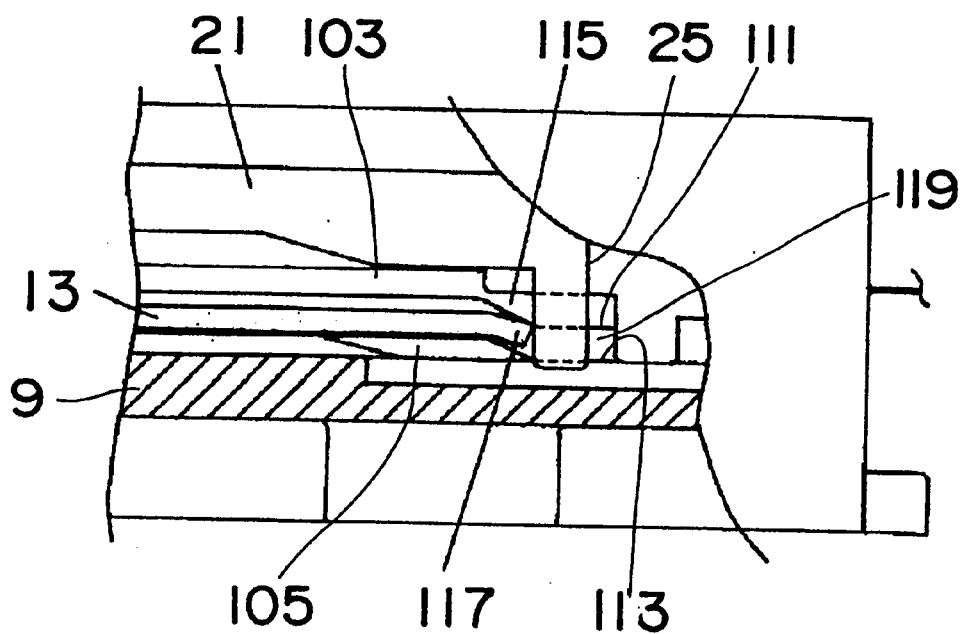
FIG. 16 is also an enlarged cut-away side elevational view of the IC card read/write device shown in FIG. 10.
Figure 17:
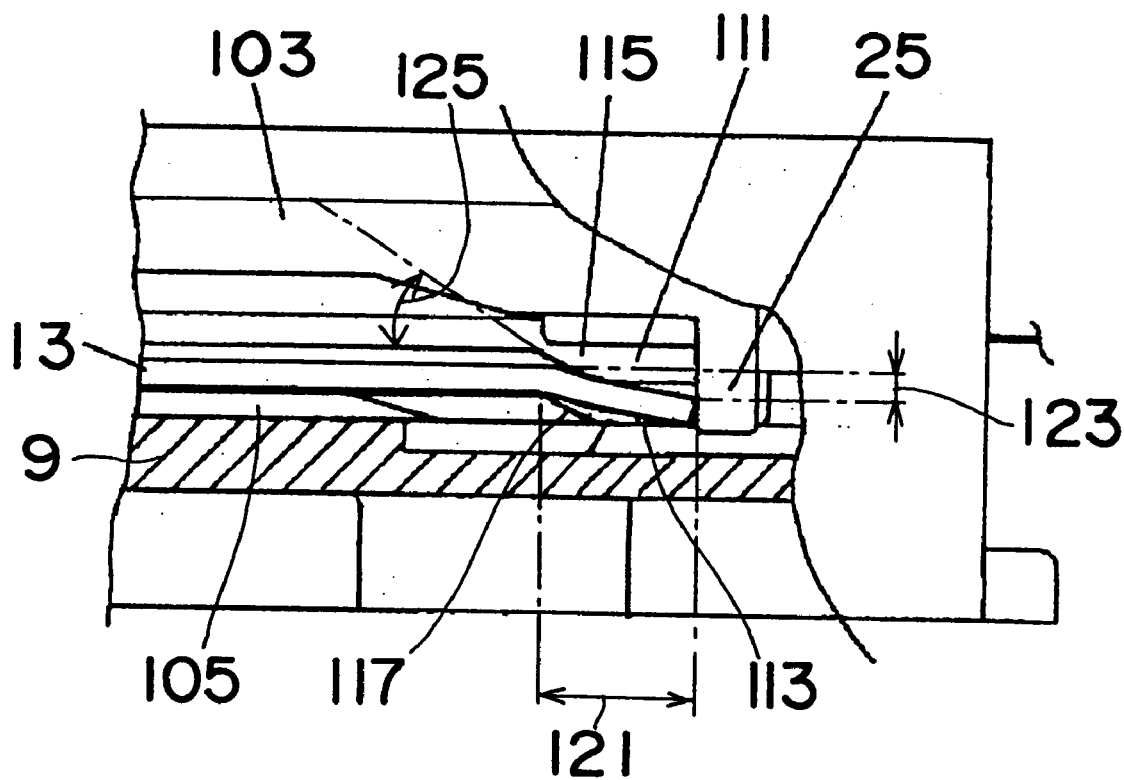
FIG. 17 is also an enlarged cut-away side elevational view of the IC card read/write device shown in FIG. 10.
Figure 18:
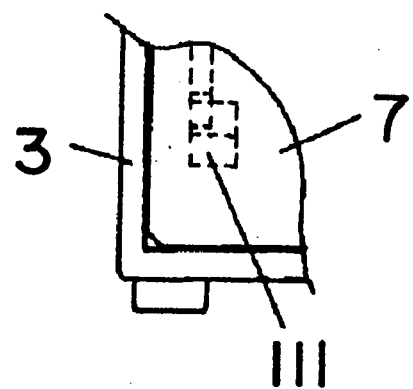
FIG. 18 is a partial plan view of the IC card read/write device shown in FIG. 10.
Figure 19:
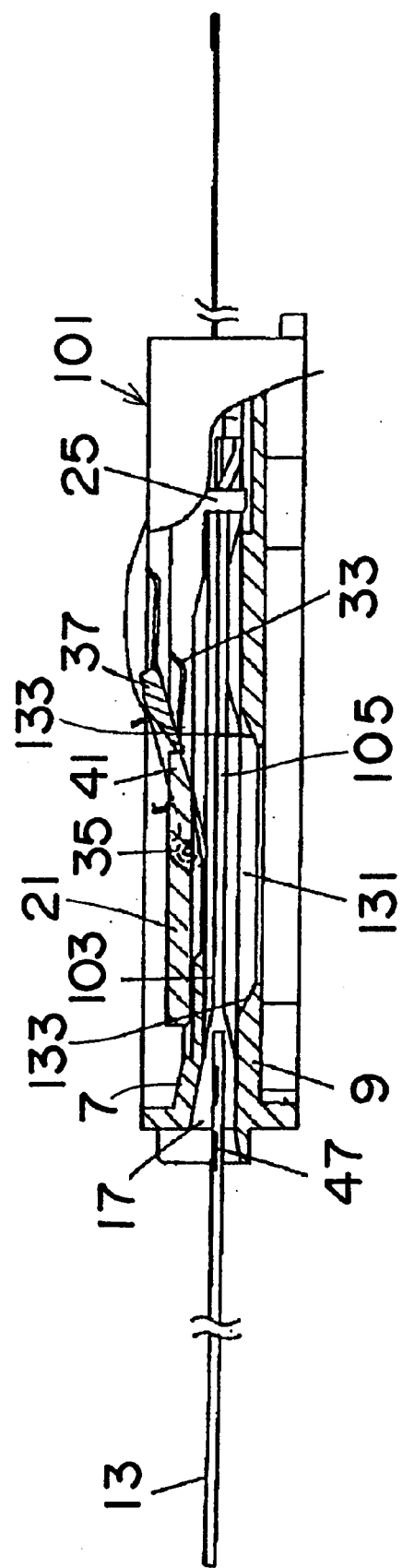
FIG. 19 is a cut-away side elevational view of the IC card read/write device of another embodiment.
Figure 20:
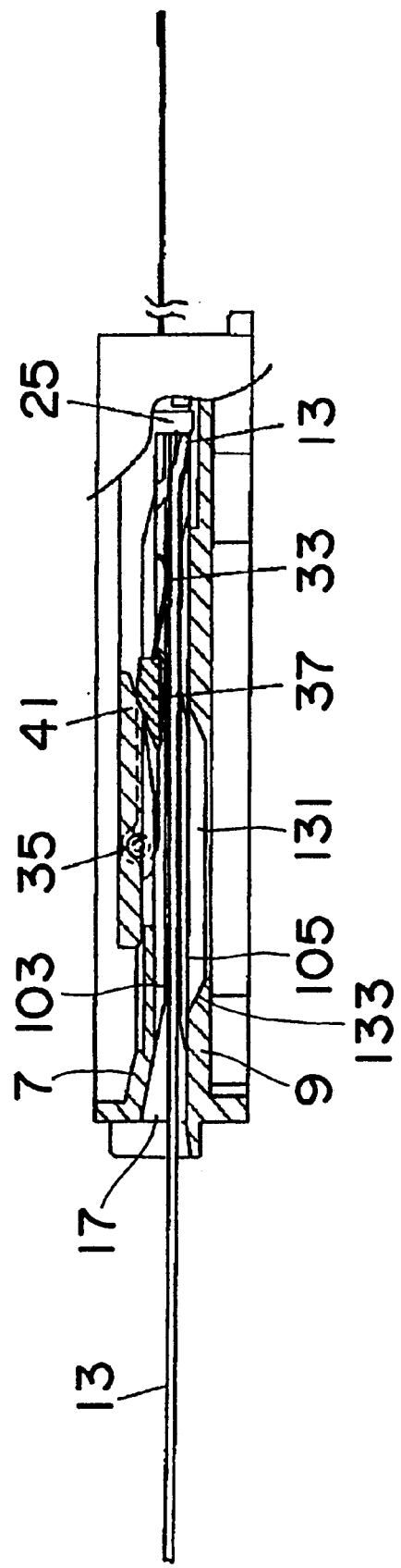
FIG. 20 is a cut-away side elevational view of the IC card read/write device shown in FIG. 19.
Figure 21:
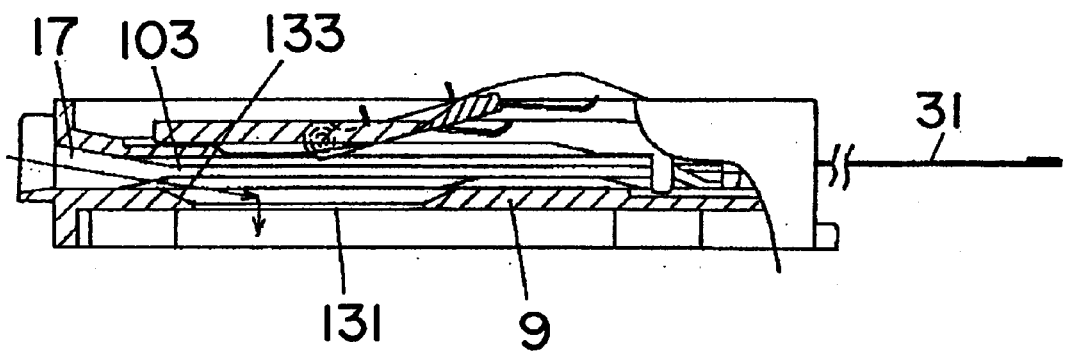
FIG. 21 is a cut-away side elevational view of the IC card read/write device shown in FIG. 19.
Figure 22:
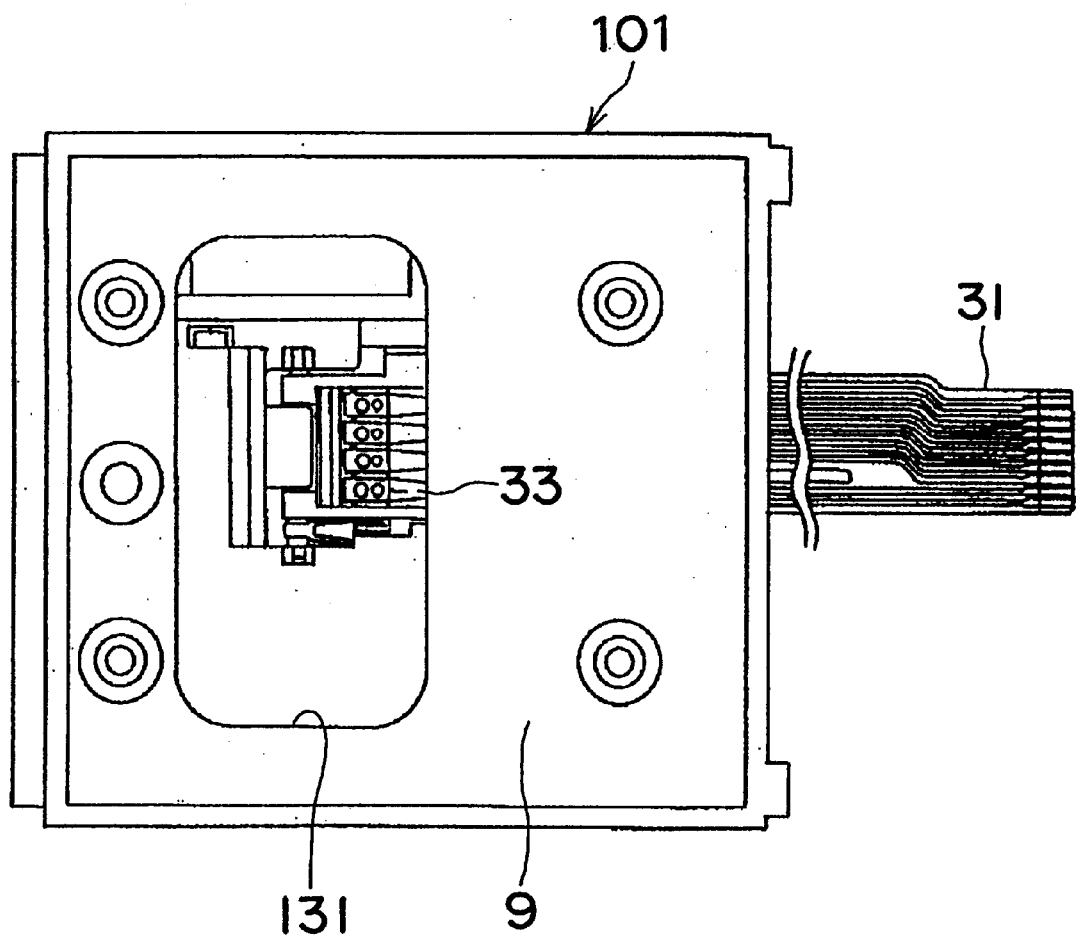
FIG. 22 is a bottom view of the IC card read/write device shown in FIG. 19.

In addition, as shown in FIGS. 15 to 17, in the vicinity of the projection 25 of the slider 21, each of the upper ribs 103 is formed with a portion 111 projected downward and each of the lower ribs 105 is formed with a portion 113 recessed downward. Also, the projected and recessed portions, 111 and 113, are ramped downward at their inlet-side ends. The ramped ends of the projected and recessed portions, 111 and 113, will be referred to as ramps, 115 and 117, hereinafter, as necessary.

An end path or gap 119 between the upper projected portion 111 and the lower recessed portion 113 and further upper and lower ramps, 115 and 117, should be dimensioned so that the regular-sized card 13 can be inserted between the projected and recessed portions, 111 and 113, and, when inserted, positively retained by frictional forces generated between the card 13 and the corresponding contact portions. Preferably, as shown in FIG. 17, a length 121 of the portion of the card 13 to be held between the projected and recessed portions, 111 and 113, is about 2 to 4 mm, and a deformation 123 of the card caused by the insertion is about 0.3 to 1.0 mm. Also preferably, an angle 125 of the ramps 115 and 117 is about 30 to 45 degrees.

Preferably, to provide both the ramps and the gap between them with a greater dimensional precision and thereby to hold the card 13 in a desired position, the top and bottom plates, 7 and 9, are made of material having a greater rigidity, such as, polybutylene terephthalate (PBT) with glass fibers, liquid crystal polymer (LCP) with glass, and polyphenylene sulfide (PPS).

Also, to determine whether the card 13 is inserted in place and thereby electrical connections are made between the contacts of the device 101 and card 13, a detector or switch may be provided adjacent to the rearward end of the card chamber 11. The detector may be any conventional optical or mechanical device such as photocoupler. For this purpose, the detector is connected through suitable cables with a controller (not shown).

Preferably, the controller includes a delay circuit so that, after a predetermined time delay from the detection of the card 13 by the detector, a required communication between the controller and the integrated circuit begins.

Figure 12:
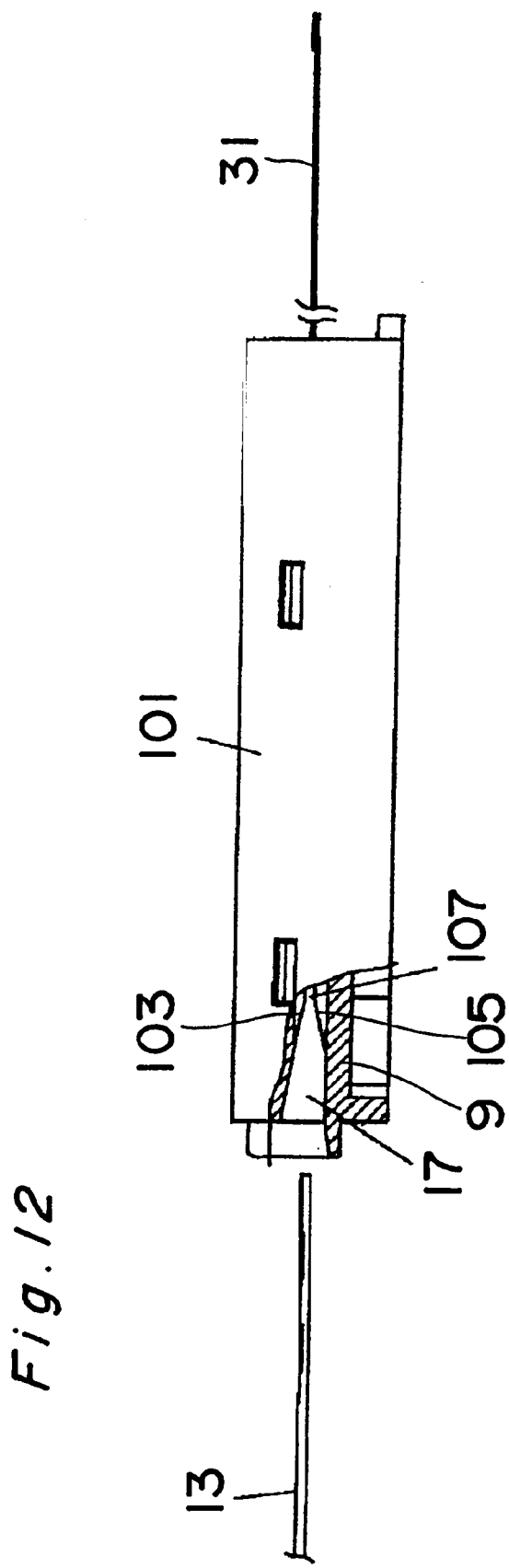
FIG. 12 is a side elevational view, partially in section, of the IC card read/write device shown in FIG. 10.
Figure 13:
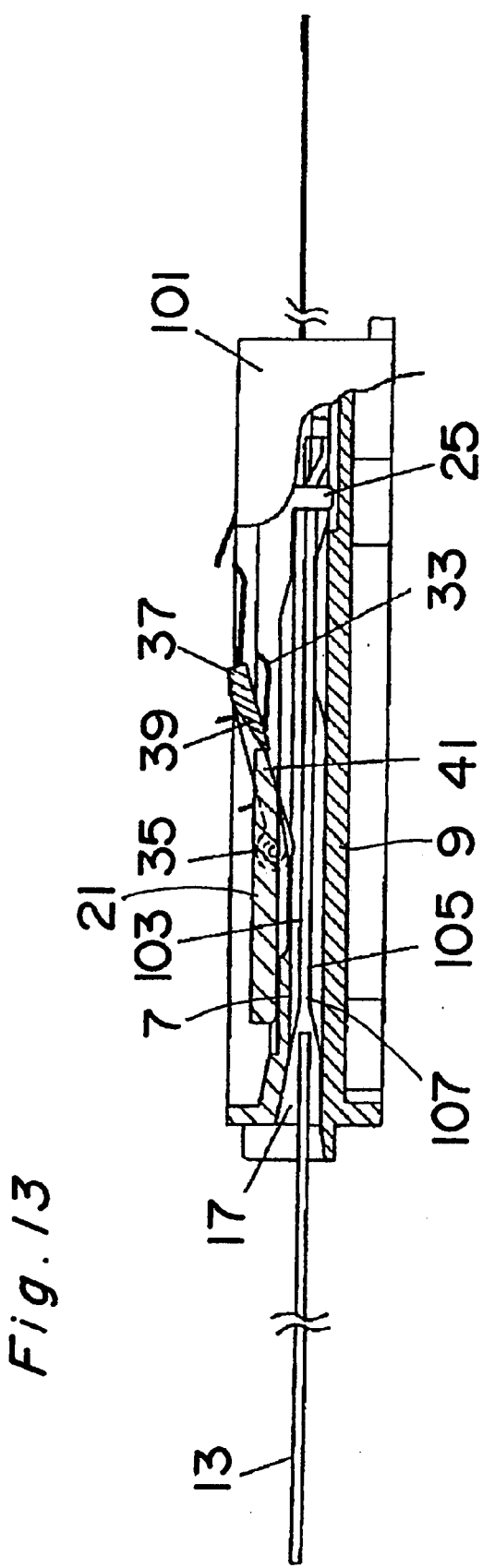
FIG. 13 is also a side elevational view, partially in section, of the IC card read/write device shown in FIG. 10.
Figure 14:
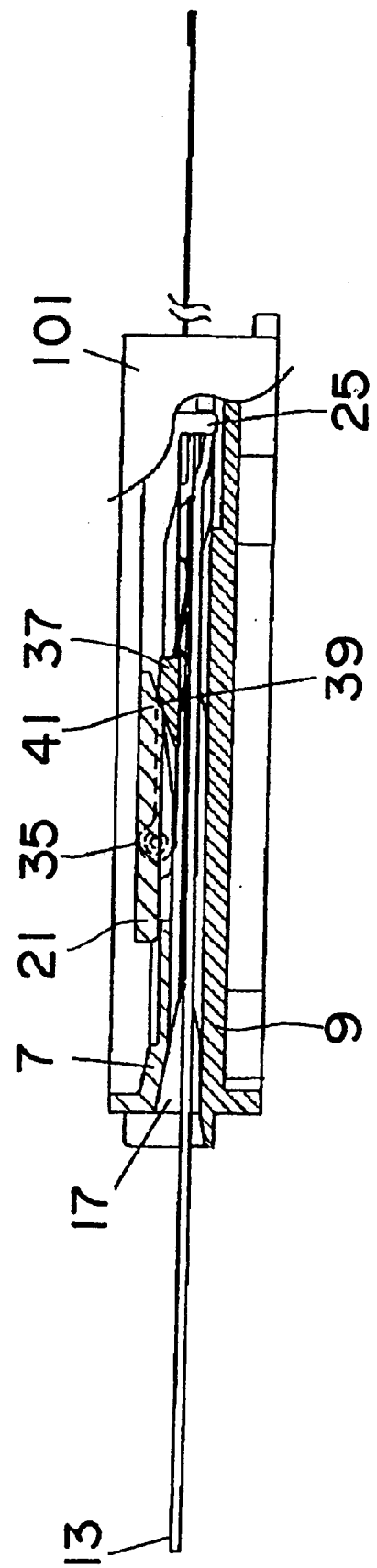
FIG. 14 is also a side elevational view, partially in section, of the IC card read/write device shown in FIG. 10.

In operation of the device 101 so constructed, as shown in FIGS. 12 to 14, the card 13 is inserted by the card user through the card inlet 17 into the card chamber 11. When the card 13 is inserted to the predetermined position, its leading edge brings into contact with the projected portion 25 of the slider 21. From this position, the card 13 is further forced into the card chamber 11 against the force of spring 23 to move the slider 21 toward the rearward end of the chamber 11. This causes that the edge 41 of the cutout 27 makes a frictional contact with the ramp 39 of the holder 29 to bring the electric contacts 33 into contact with the associated contacts 47 in the upper surface of the card 13.

Then, as shown in FIGS. 15 to 17, the leading edge of the card 13 is forced in between the opposing ramps 115 and 117, preferably about 2 to 4 mm, so that it is deformed about 0.3 to 1.0 mm. This results in a frictional force between the deformed end of the card 13 and portions 111 and 113, which retains the card 13 in the inserted position positively.

Note that, when the card 13 makes a contact with the upper ramps 111, the user feels the contact of between the card 13 and the ramps 111. Also, when the card 13 is further inserted from this contact position to between the ramps, the user receives a click derived from the bending of the leading end of the card 13.

At the completion of the card insertion, each of the electric contacts 33 of the holder 29 makes a contact with the associated contact 47 of the card 13. At the same time, the card detector detects that the card 13 has been inserted to a predetermined position and then transmits a signal to through the corresponding cables to the controller. The controller, after a short time delay, begins to communicate with the integrated circuit in the card 13.

After the completion of the required communication, the card 13 is held by the user at its forward end and then pulled out from the card chamber 11. This causes the slider 21 to return to its original position by the spring 23. This also causes the holder 29 to disengage with the edge 41 of the cutout 27 and then rotate upward from the card chamber.

As can be seen from above, the card 13 inserted in the card chamber 11 can positively be held without any translation, regardless of possible vibrations generated in and transmitted from other neighboring devices. In particular, the projected and recessed portions, 111 and 113, made of rigid material holds the card 13 in the predetermined position with a great precision, regardless of the spring force biasing the card toward the inlet from the ramps 115 and 117. This ensures a good communication between the integrated circuit with the controller.

Although the projected and recessed portions are formed in the top and bottom plates, 7 and 9, respectively, they may be formed opposite plates.

Also, although the forward end of the recessed portion is also ramped similar to the opposing ramp of the projected portion, it may be stepped downward to define a space in which the leading end of the card can move in.

Further, although the ramp 115 of the projected portion 111 extends linearly, it may be curved instead.

FIGS. 19 to 22 illustrate another embodiment of the device, in which the bottom plate 9 is formed with an opening 131 between the left and right ribs 105. The opening 131 is sized so that it has about 45 mm in the transverse direction and about 22 mm in the insert direction. Preferably, a peripheral edge 133 of the opening 131 is ramped downward so that, when a foreign insert such as coin is inserted in the card chamber 11, it would be guided into the opening 131 and then removed out of the chamber 11. Advantageously, the opening 131 is provided on the forward side of the contacts 33 to prevent the contacts 33 from being damaged by the contact with the foreign inserts and to allow the inserts to drop off through the opening 131 by their weight.

With this arrangement, the foreign inserts will be removed from the chamber 11 and the contacts 33 can be protected from such inserts.

Figure 23:
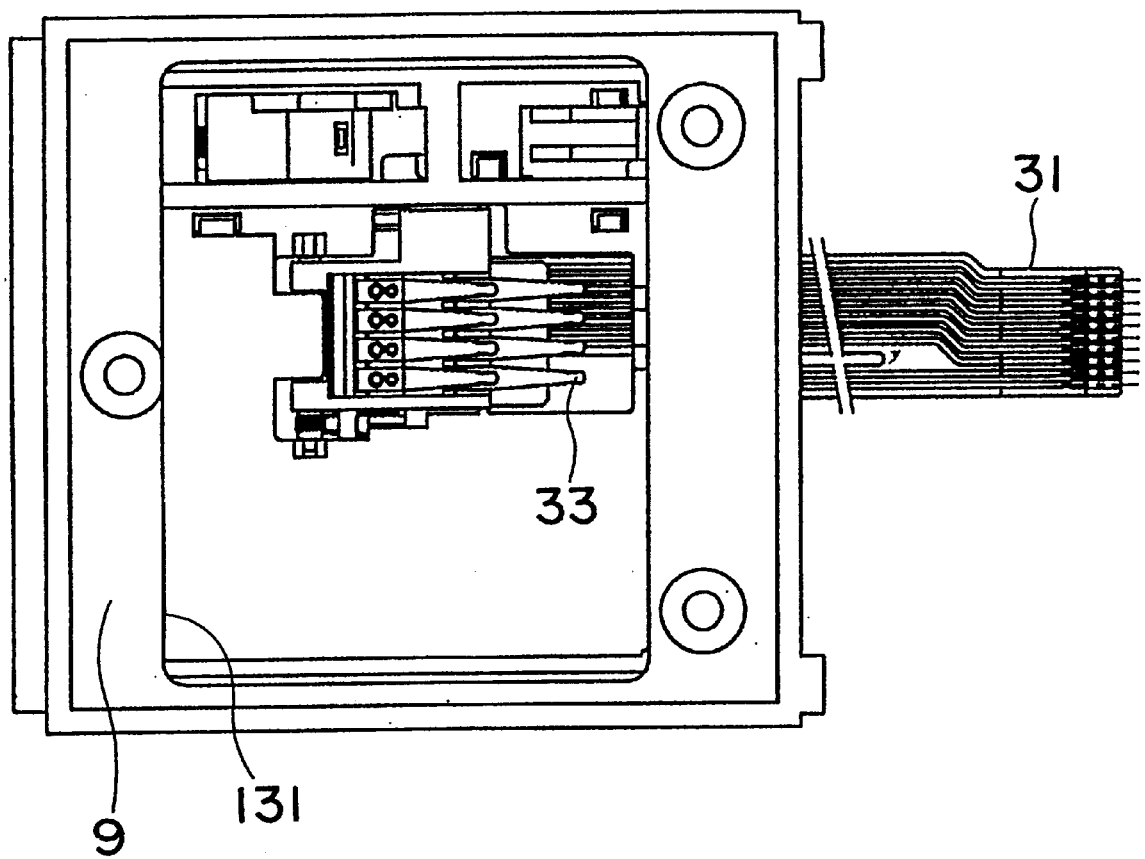
FIG. 23 is a bottom view of another IC card read/write device.
Figure 24:
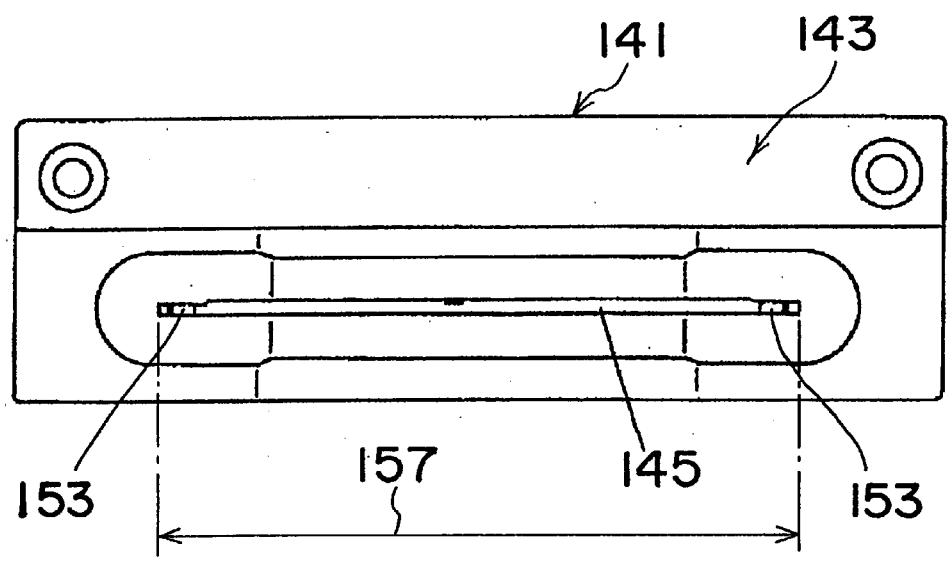
FIG. 24 is a front view of a protection cover according to the present invention.
Figure 25:
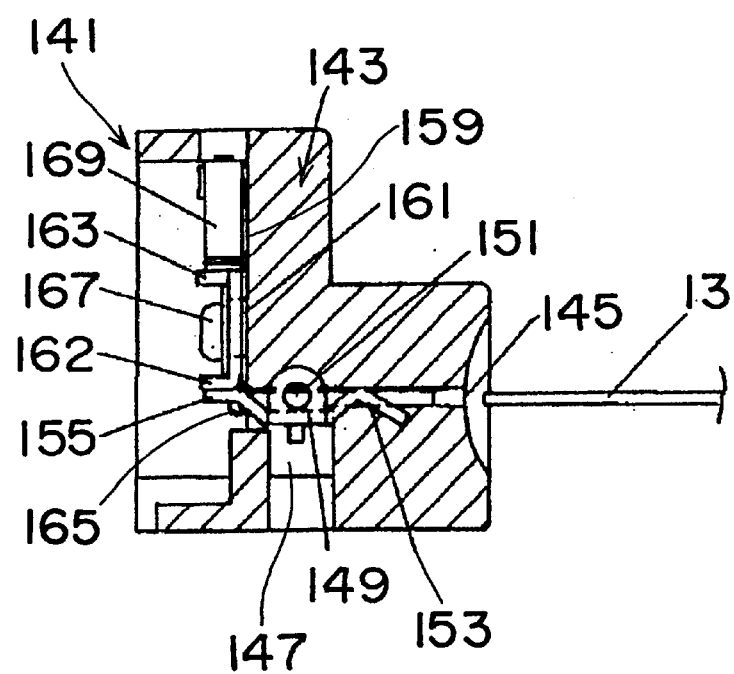
FIG. 25 is a cut-away side elevational view of the protection cover shown in FIG. 24.
Figure 26:
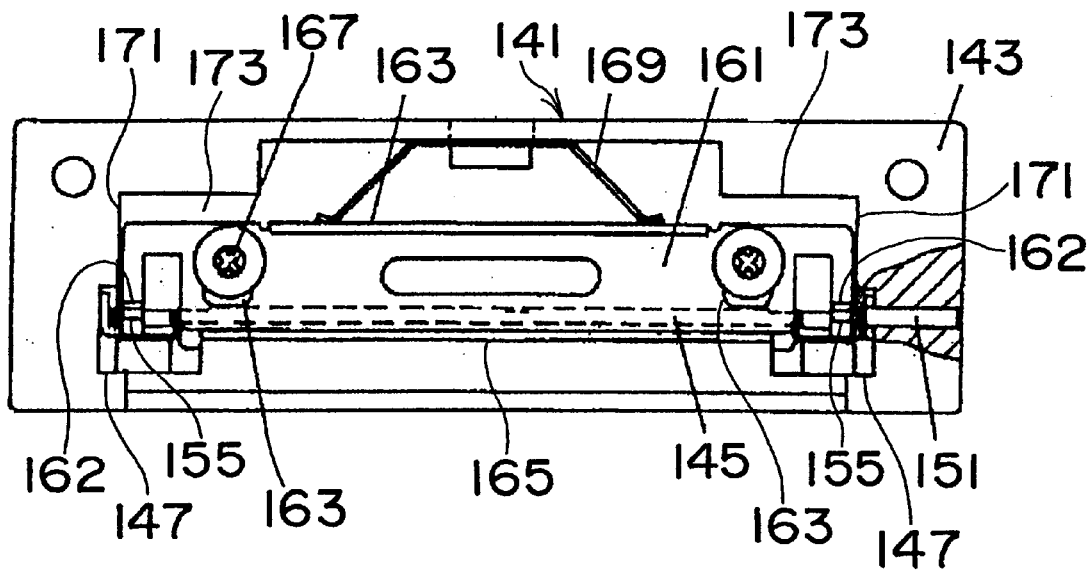
FIG. 26 is another front view of the protection cover shown in FIG. 24.
Figure 27:
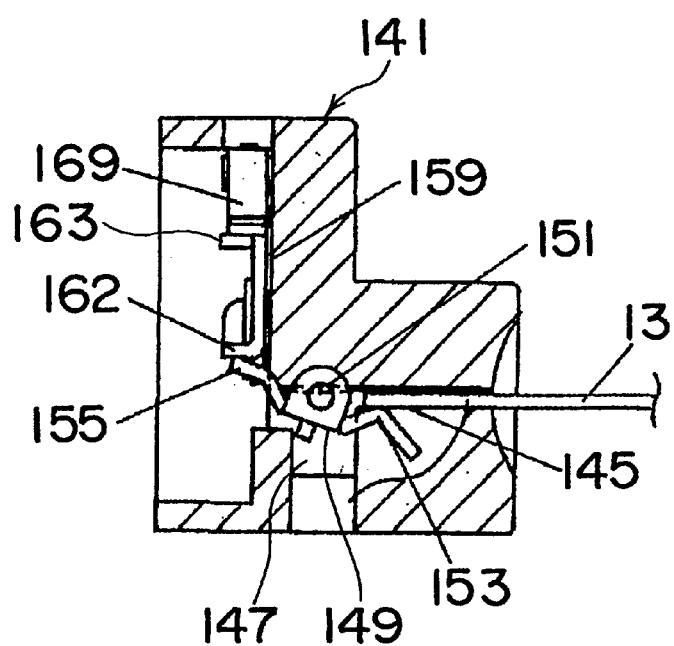
FIG. 27 is a cut-away side elevational view of the protection cover shown in FIG. 26.
Figure 28:
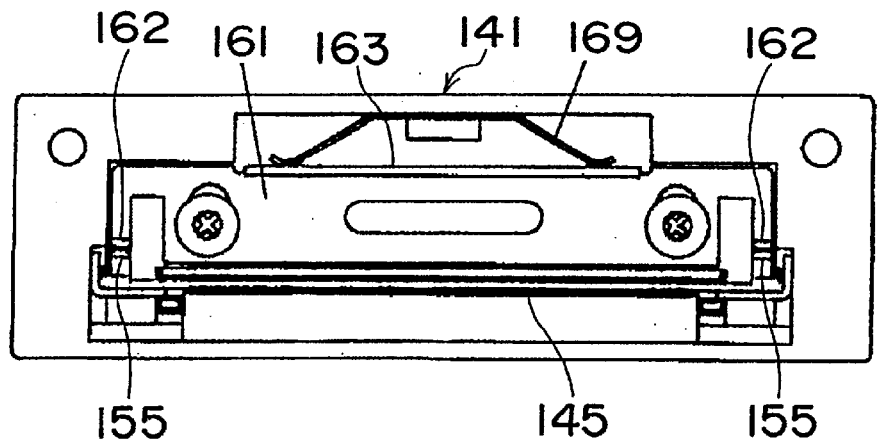
FIG. 28 is another front view of the protection cover shown in FIG. 24.
Figure 29:
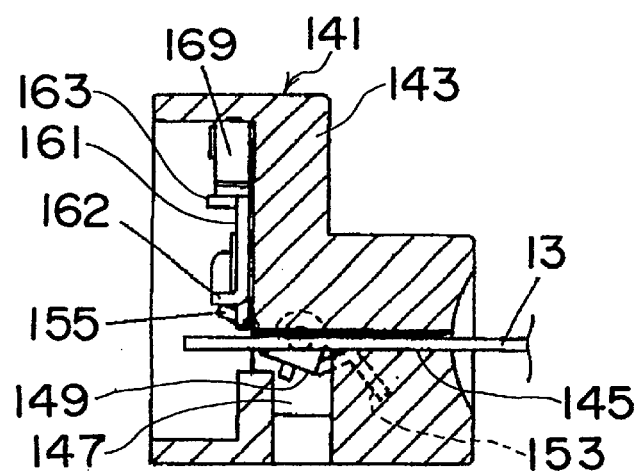
FIG. 29 is a cut-away side elevational view of the protection cover shown in FIG. 28.
Figure 30:
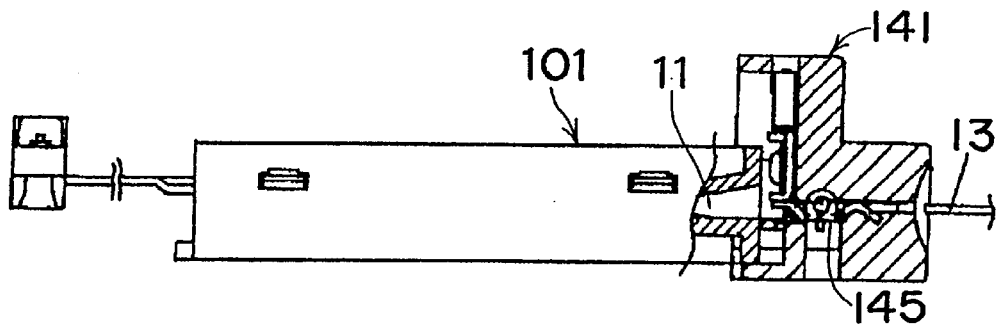
FIG. 30 is a side elevational view, partially in section, of the IC card read/write device to which the protection cover is assembled.
Figure 31:
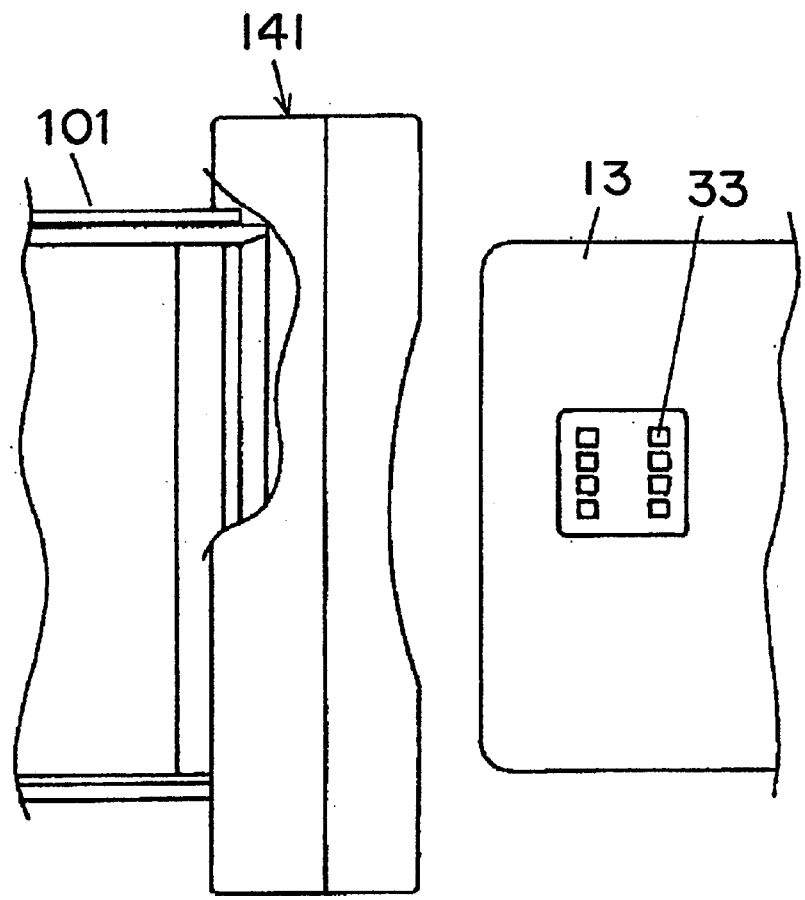
FIG. 31 is a partial plan view of the IC card read/write device and the IC card.

The size of the opening 131 described above is not restrictive to the present invention and may be enlarged as large as possible provided that it does not result in a decrease in a structure strength of the device bottom plate 9. For example, as shown in FIG. 23, the opening 131 may be sized so that it is greater than the regular card size (i.e., 53.92 to 54.03 mm) in its transverse direction regulated in the ISO 7815 and smaller in the insert direction (e.g., 54.5 mm in the transverse direction and 40 mm in the insert direction.) In this instance, an irregular card having the regular transverse size but smaller in the longitudinal size can be removed out of the opening 131. The regular card, on the other hand, can be moved over the opening 131 to the predetermined read/write position without falling into the opening.

FIGS. 24 to 32 illustrate a protection cover generally indicated by reference numeral 141. The protection cover 141, which is mounted in front of the IC card read/write device 101 described above, has a front housing generally indicated by reference numeral 143. The front housing 143 is formed with a slot 145 extending between its front and rear surfaces, through which the IC card 13 is inserted into the card chamber 11. The slot 145 should be designed so that a distance between upper and bottom surfaces of the slot 145 is slightly greater than the thickness of the regular sized IC card.

Also, the housing 143 has recesses 147 at its left and right sides of the slot 145, in each of which a card guide 149 is positioned. The card guide 149, which is supported by a shaft 151 running perpendicular to the card insert-direction, has a first arm 153 extending toward an inlet of the slot 145 and a second arm 155 extending toward an outlet of the slot 145. The first arm 153, which is located in left and right sides of a region 157 in which the regular size card 13 is inserted (see FIG. 24), is bent upward at its mid-portion so that the leading edge of the regular size card 13 being inserted in the region 157 would make a contact with an upper surface portion of the first arm 153 to rotate it downward. The second arm 155, on the other hand, is located outside the region 157 so that it would not make any engagement with the inserting card 13.

Provided on a wall 159 of the housing 143, adjacent to the outlet of the slot 145, is a shutter 161 made from a rectangular plate with its upper and lower ends 163 and 165 extended toward the card chamber 11. The shutter 161 is supported by the combination of vertical slots 163 formed in the shutter 161 and guide bosses (not shown) formed in the wall 159, each positioned in the corresponding vertical slots 163, so that it can move between lowered and lifted positions shown in FIGS. 25 and 27, respectively. Also, the shutter 161 is fixed by bolts 167 each inserted through the slots 163 so that it can slide up and down.

Left and right ends 162 of the shutter 161 are extended out beyond the region 157 over the second arms 155 of the card guide 149 so that the extended left and right ends are supported on the left and right second arms 155, which ensures that, according to the rotation of the card guide 149, the shutter 161 moves up and down between its lifted and lowered positions.

The card guide 149 and shutter 161 are so dimensioned that, in the lifted position, a lower portion of the shutter 161 opens the outlet of the slot 145 and, in the lowered position, the lower portion of the shutter 161 closes the outlet of the slot 145.

It should be noted that the card guide 149 is designed so that, only when the mid-portion of the first arm is completely moved away from the slot 145, the shutter 161 can fully be removed from the outlet of the slot 145. This ensures that only when the regular IC card is inserted in the slot 145, the shutter 161 is completely removed out of the outlet of the slot 145, and when the irregular card such as thinned telephone card is inserted in the slot 145, a major part of the outlet is still closed by the shutter 161 and thereby the irregular card is prevented from moving into the card chamber 11.

Preferably, to allow that the shutter 161 to return from the lifted position to the lowered position, the shutter 161 is biased downward by a leaf spring 169 mounted on the shutter 161.

Also preferably, to cause the shutter 161 to move smoothly and vertically between the lifted and lowered positions and to limit its lifted position, the wall 159 of the housing 143 is formed with vertical and horizontal steps, 171 and 173, adjacent to corresponding vertical and horizontal edges of the shutter 161.

In operation, the card 13 inserted in the slot 145 by the user makes contacts at its leading edge with the upper bent surfaces of the left and right first arms 153. Then, further insertion of the card 13 moves the first arms 153 downward. This in turn moves the second arms 155 upward, causing the shutter 161 to move away from the outlet of the slot 145 into the lifted position, which opens the outlet of the slot 145 and thereby allows the card 13 to move into the card chamber 11.

At pulling out the card 13 from the card chamber 11 and then the slot 145, when the leading edge of the card 13 is passed over the first arms 153, the card guides 149 are forced down to the lowered position by the shutter 161 and the leaf spring 169.

Although the first and second arms, 153 and 155, are provided only on the left and right sides of the slot 145, they may also be provided at its center.

Also, the shutter 161 is provided on the upper portion of the wall 159, it may be arranged on its lower portion so that it moves up and down to close and open the outlet of the slot 145.

Figure 32:
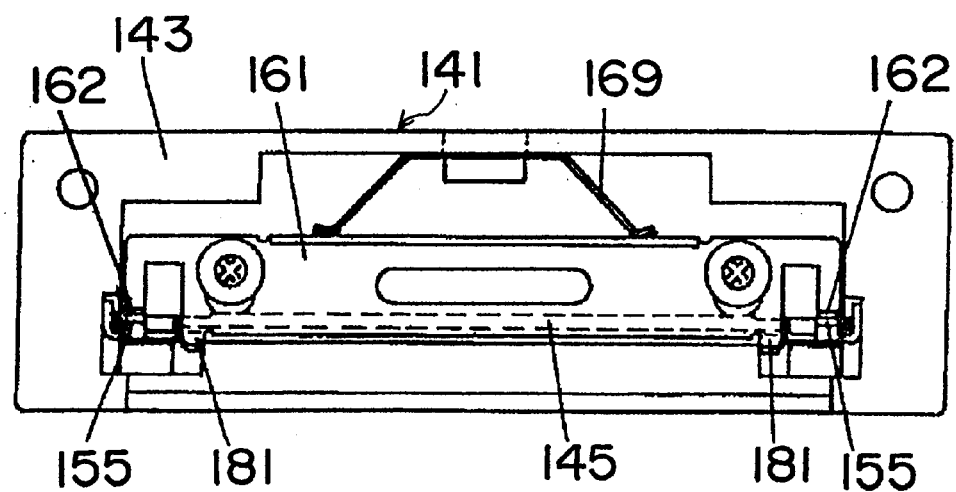
FIG. 32 is a front view of a protection cover of another embodiment.
Figure 33:
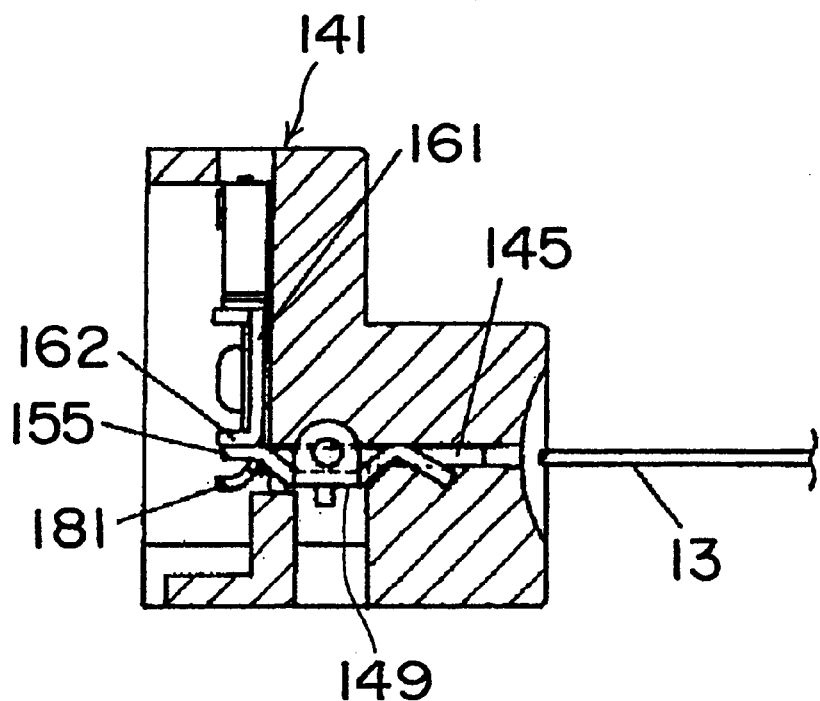
FIG. 33 is a cut-away side elevational view of another protection cover.
Figure 34:
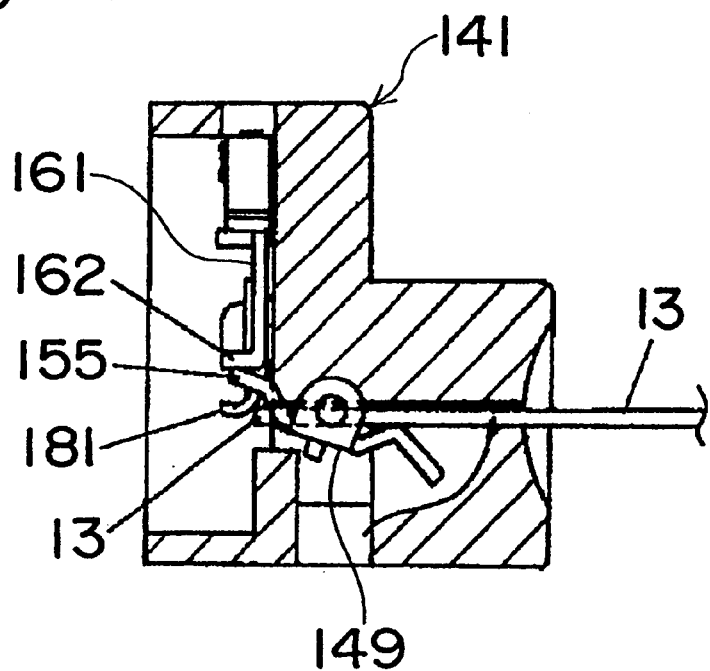
FIG. 34 is another cut-away side elevational view of the protection cover shown in FIG. 33.
Figure 35:
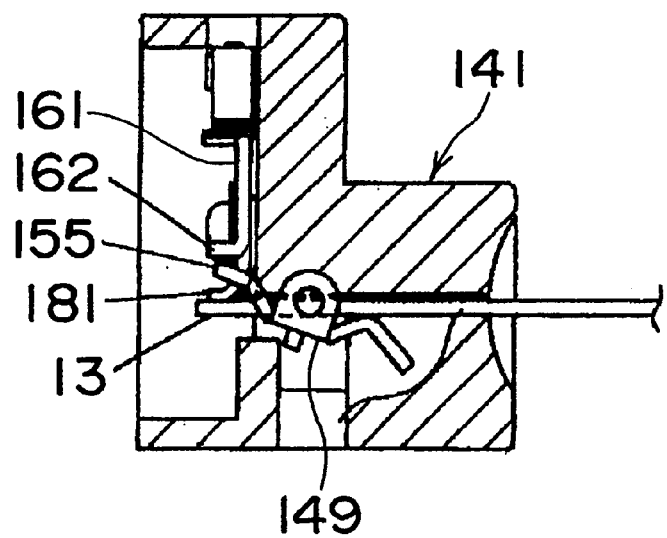
FIG. 35 is another cut-away side elevational view of the protection cover shown in FIG. 33.
Figure 36:
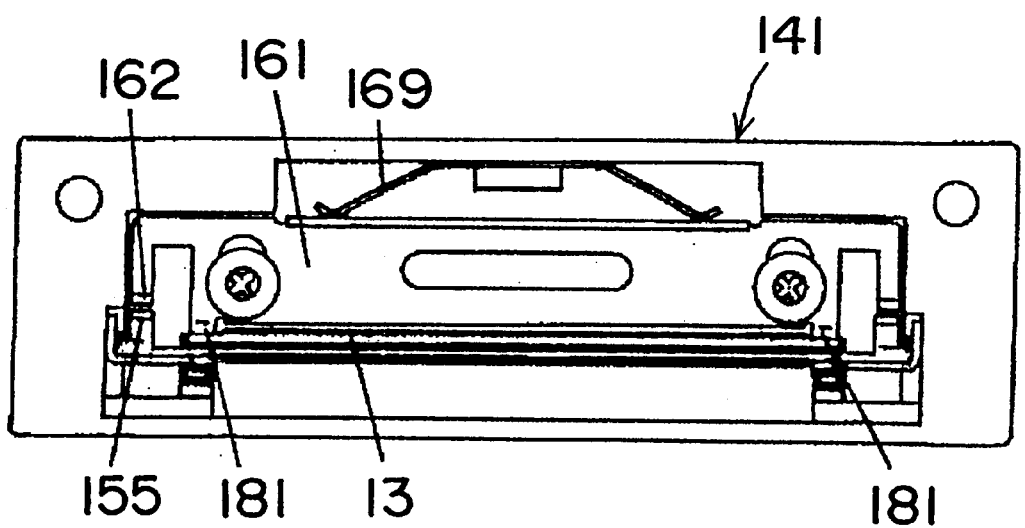
FIG. 36 is a front view of a protection cover of another embodiment.
Figure 37:
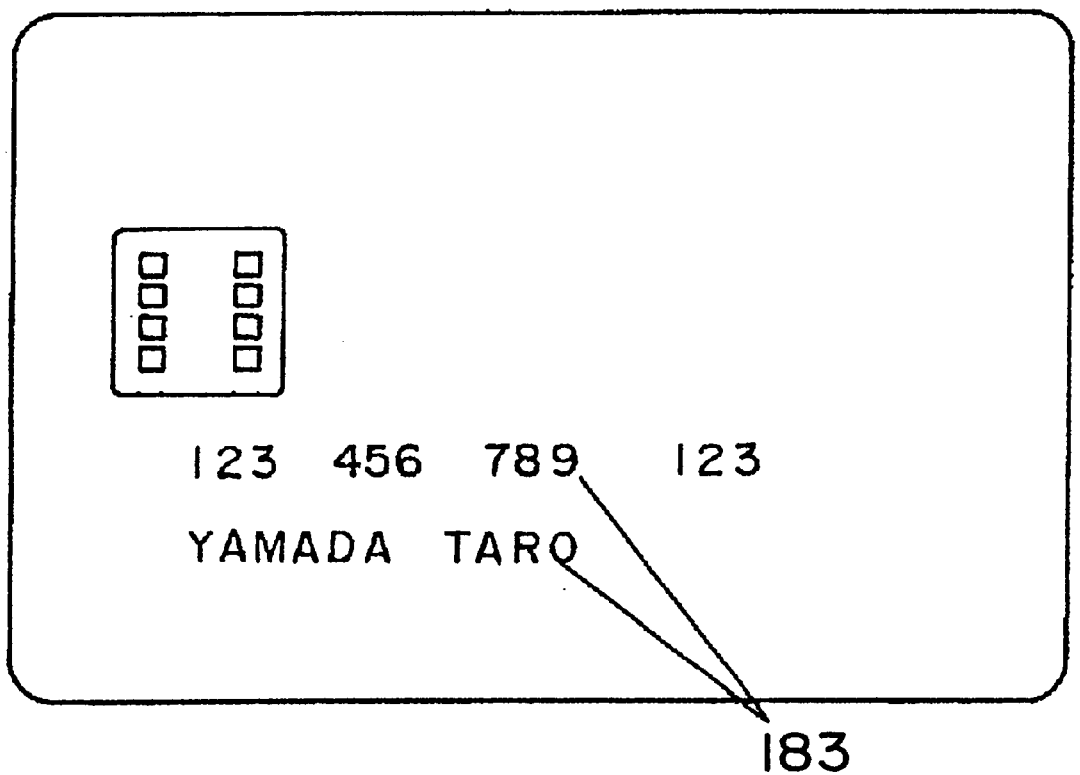
FIG. 37 is an enlarged plan view of an IC card.
Figure 38:
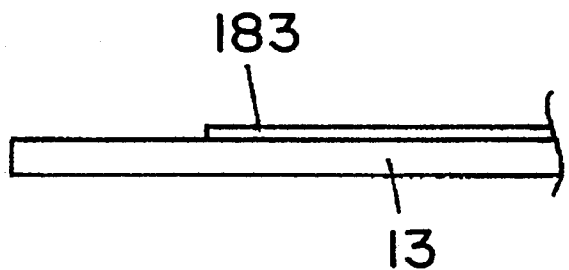
FIG. 38 is an enlarged partial cut-away view of the IC card shown in FIG. 37.

Further, as shown in FIGS. 32 and 36, tongues 181 each curved toward the card chamber is provided on the left and right bottom portions of the lower end 165 of the shutter 161. In this instance, after the shutter 161 is lifted away from the outlet of the slot 145, the leading edge of the card 13 makes frictional contact with the tongues 181, which further forces the shutter 161 upward. This modification is effective for the IC card in which its thickness varies depending upon positions due to the existence of embossed alphabets and/or numbers 183 as shown in FIGS. 37 and 38. Note that the tongues 181 should be arranged so that each of which makes a contact with limited upper surface portions of the IC card in which the embossing can be applied (i.e., regions within 3 mm from the longitudinal edges and the mid-portion between them.)

Figure 39:
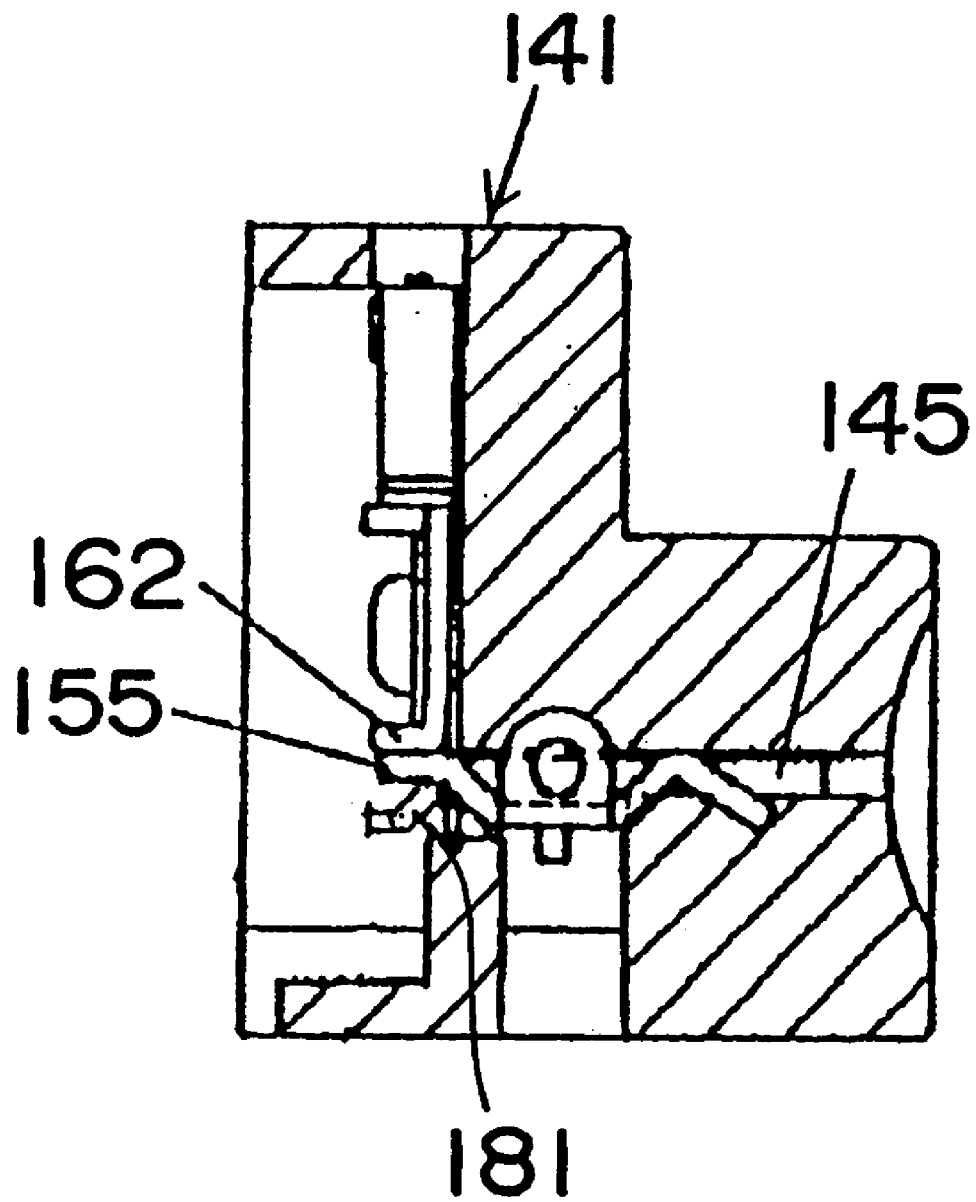
FIG. 39 is a cut-away side elevational view of the protection cover of another embodiment.

Although the tongues are curved in the previous embodiment, they may be bent at about 30 to 60 degrees as shown in FIG. 39.

Accordingly, with the protection cover described above, when the irregular card such as thinned telephone card is inserted in the slot 145, it is restricted by the shutter that is still closing the major part, in particular upper portion, of the outlet of the slot 145.

Also, a card smaller than the regular card fails to make contacts with the first arms 153, so that it is limited by the shutter from moving into the card chamber 11.

It is of course that even the regular card can not be inserted in a skewed position.

Although the present invention has been fully described in connection with the IC card read/write device in which the integrated circuit in the card is communicated through a physical contact of the contacts of between the IC card and the device, it may equally be applied to a non-contact type of IC card read/write device in which the integrated circuit is communicated with the controller through another communication technique using radio signal and light.

What is claimed is:

1. An IC card read/write apparatus, comprising:
 a frame having first and second parallel guides spaced apart from each other to define a chamber for receiving an IC card;
 a card inlet at one end of the chamber through which the IC card can be inserted into the chamber; and
 a terminal portion at an opposite end of the chamber, with said terminal portion being angled relative to the chamber such that a leading end of the IC card inserted into the chamber is forced into and held by said terminal portion, wherein said terminal portion comprises a first ramp extending from said first guide toward said second guide, and a first recess on a side of said second guide that is opposite to the side of said second guide on which said first guide is located.

2. The IC card read/write apparatus according to claim 1, wherein said first recess is defined by a second ramp extending from said second guide away from said first guide.

3. The IC card read/write apparatus according to claim 2, further comprising at least one additional terminal portion, with said at least one additional terminal portion being angled relative to the chamber such that the leading end of the IC card inserted into the chamber is forced into and held by said at least one additional terminal portion, wherein said at least one additional terminal portion comprises a third ramp extending from said first guide toward said second guide, and a second recess on a side of said second guide that is opposite to the side of said second guide on which said first guide is located, with said second recess being defined by a fourth ramp extending from said second guide away from said first guide.

4. The IC card read/write apparatus according to claim 3, wherein said first ramp extends from said first guide at an angle of between about 30 and 45 degrees relative to said first guide, said second ramp extends from said second guide at an angle of between about 30 and 45 degrees relative to said second guide, said third ramp extends from said first guide at an angle of between about 30 and 45 degrees relative to said first guide, and said fourth ramp extends from said second guide at an angle of between about 30 and 45 degrees relative to said second guide.

5. The IC card read/write apparatus according to claim 4, wherein said first ramp, said second ramp, said third ramp and said fourth ramp each comprise a rigid material.

6. The IC card read/write apparatus according to claim 2, wherein said second ramp extends from said second guide at an angle of between about 30 and 45 degrees relative to said second guide.

7. The IC card read/write apparatus according to claim 2, wherein said second ramp comprises a rigid material.

8. The IC card read/write apparatus according to claim 2, wherein said first ramp extends from said first guide at an angle of between about 30 and 45 degrees relative to said first guide, and said second ramp extends from said second guide at an angle of between about 30 and 45 degrees relative to said second guide.

9. The IC card read/write apparatus according to claim 2, wherein said first ramp and said second ramp each comprise a rigid material.

10. The IC card read/write apparatus according to claim 1, wherein said first ramp extends from said first guide at an angle of between about 30 and 45 degrees relative to said first guide.

11. The IC card read/write apparatus according to claim 1, wherein said first ramp comprises a rigid material.

12. The IC card read/write apparatus according to claim 1, further comprising at least one additional terminal portion, with said at least one additional terminal portion being angled relative to the chamber such that the leading end of the IC card inserted into the chamber is forced into and held by said at least one additional terminal portion.

13. The IC card read/write apparatus according to claim 12, wherein said at least one additional terminal portion comprises a third ramp extending from said first guide toward said second guide, and a second recess on a side of said second guide that is opposite to the side of said second guide on which said first guide is located.

14. The IC card read/write apparatus according to claim 13, wherein said second recess is defined by a fourth ramp extending from said second guide away from said first guide.

15. The IC card read/write apparatus according to claim 14, wherein said fourth ramp extends from said second guide at an angle of between about 30 and 45 degrees relative to said second guide.

16. The IC card read/write apparatus according to claim 14, wherein said fourth ramp comprises a rigid material.

17. The IC card read/write apparatus according to claim 14, wherein said third ramp extends from said first guide at an angle of between about 30 and 45 degrees relative to said first guide, and said fourth ramp extends from said second guide at an angle of between about 30 and 45 degrees relative to said second guide.

18. The IC card read/write apparatus according to claim 14, wherein said third ramp and said fourth ramp each comprise a rigid material.

19. The IC card read/write apparatus according to claim 13, wherein said third ramp extends from said first guide at an angle of between about 30 and 45 degrees relative to said first guide.

20. The IC card read/write apparatus according to claim 13, wherein said third ramp comprises a rigid material.

* * * * *